G. M. JOHNSON.
Land-Marker.
No. 51,725.
Patented Dec 26, 1865.
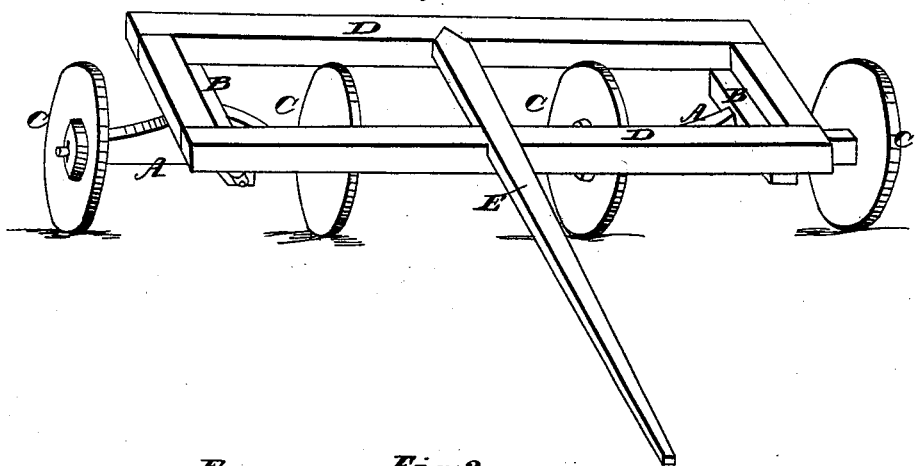
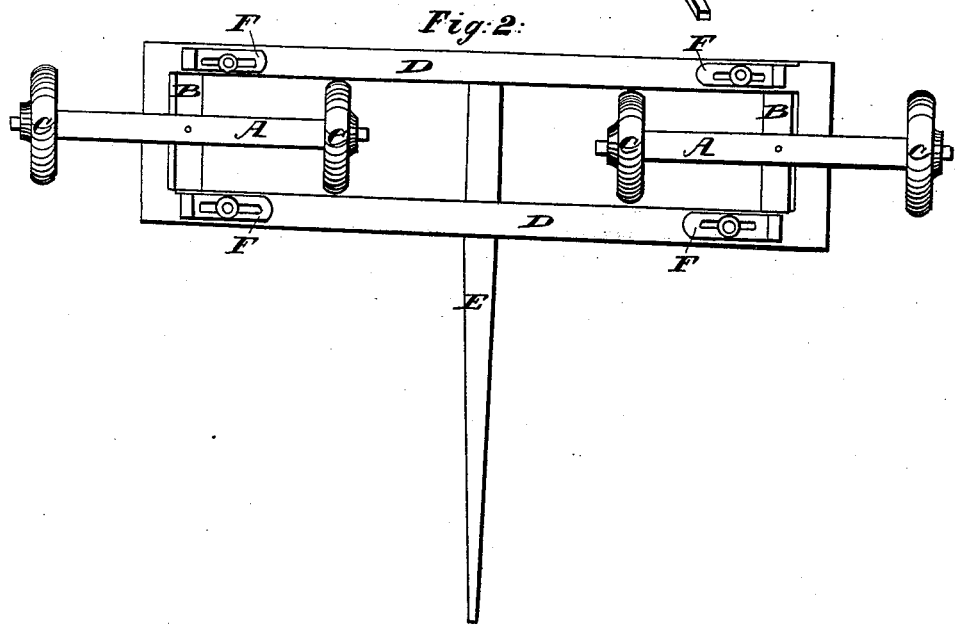

UNITED STATES PATENT OFFICE.

GALLATIN M. JOHNSON, OF DECORAH, IOWA.

MACHINE FOR MARKING CORN-GROUND FOR PLANTING.

Specification forming part of Letters Patent No. 51,725, dated December 26, 1865.

*To all whom it may concern:*

Be it known that I, GALLATIN JOHNSON, of the town of Decorah, in the county of Winneshiek and State of Iowa, have invented an Improvement on Machines for Marking Land; and I do hereby declare that the following is a full, clear, and exact description of the construction and operation of the same, reference being had to the annexed drawings, making a part of this specification, in which—

Figure 1 is a perspective view, and Fig. 2 is a bottom plan.

This invention relates to a new and improved method of marking land into rows preparatory to the reception of seed.

This machine consists of a frame, D, with a tongue, E, attached. To the under side of this frame are attached two axles, B B, one at each end and parallel with the tongue. These axles are retained in their positions by movable slotted boxes F F F F. To these axles, and at right angles with them, are fastened securely another pair of axles, A A, on the ends of which the wheels that carry the machine revolve. The peripheries of these wheels are rounded, so that as they pass over the land the weight of the machine causes them to sink into the ground, thus leaving a furrow in which the seeds may be planted, the wheels adjusting or accommodating themselves to the unevenness of the ground in consequence of their axles being attached to axles B B, which move freely in their bearings, the distance between the furrows being regulated by turning one or both of the wheels, with their hubs H H, out or in, thereby increasing or decreasing the distance between the wheels on the same axle, and by means of the slotted boxes F F increasing or decreasing the distance between the two axles.

What I claim as my invention, and desire to secure by Letters Patent, is—

A machine for the purpose of marking land, with two independent adjustable axles, arranged and operated substantially as described.

GALLATIN M. JOHNSON.

Witnesses:
 HENRY KELLY,
 CHAS. W. GREENUP.